US011561561B2

(12) United States Patent
Vandenheste et al.

(10) Patent No.: US 11,561,561 B2
(45) Date of Patent: Jan. 24, 2023

(54) SYSTEM AND METHOD OF MACHINE LEARNING AND AUTONOMOUS EXECUTION ON USER PREFERENCES FOR USE IN GARMENTS

(71) Applicant: Polar Seal Limited, Hong Kong (HK)

(72) Inventors: Antoine Vandenheste, Hong Kong (HK); Sebastien Vandenheste, Hong Kong (HK); Francois Vandenheste, Hong Kong (HK)

(73) Assignee: Polar Seal Limited, Hong Kong (HK)

( * ) Notice: Subject to any disclaimer, the term of this patent is extended or adjusted under 35 U.S.C. 154(b) by 844 days.

(21) Appl. No.: 16/468,676

(22) PCT Filed: Jun. 15, 2018

(86) PCT No.: PCT/IB2018/054415
§ 371 (c)(1),
(2) Date: Jun. 11, 2019

(87) PCT Pub. No.: WO2018/234961
PCT Pub. Date: Dec. 27, 2018

(65) Prior Publication Data
US 2020/0081462 A1    Mar. 12, 2020

Related U.S. Application Data

(60) Provisional application No. 62/521,546, filed on Jun. 19, 2017.

(30) Foreign Application Priority Data

Sep. 29, 2017   (HK) .................................. 17109940.3
Apr. 12, 2018   (CN) .......................... 201820523929.6

(51) Int. Cl.
*G05D 23/19*    (2006.01)
*G06N 20/00*    (2019.01)
(Continued)

(52) U.S. Cl.
CPC ....... *G05D 23/1917* (2013.01); *A41D 13/005* (2013.01); *G05B 13/0265* (2013.01);
(Continued)

(58) Field of Classification Search
CPC ....... G05B 13/0265; G06F 1/163; G06F 1/26; G05D 23/1917; A41D 13/005
See application file for complete search history.

(56) References Cited

U.S. PATENT DOCUMENTS 8,660,970 B1 *  2/2014  Fiedorowicz ........... H04L 67/30
706/14
10,424,179 B2 *  9/2019  Kranz ................. H04M 1/6041
(Continued)

FOREIGN PATENT DOCUMENTS

CN    206025278 U     3/2017
WO    2016151099 A1   9/2016
WO    2017002105 A1   1/2017

OTHER PUBLICATIONS

European Search Report of corresponding European Patent Application No. 18820339.2 issued by European Patent Office dated Jan. 14, 2021.
(Continued)

*Primary Examiner* — Santosh R Poudel
(74) *Attorney, Agent, or Firm* — Idea Intellectual Limited; Margaret A. Burke; Sam T. Yip

(57) ABSTRACT

The present invention relates to a system with active learning and execution of user's preference functionalities for use in a garment. The present system includes a sensor module, an optional user input panel and/or interface, a printed circuit board, a power source and an output. In an event that a user of the present system voluntarily changes the output setting during the operation of the system, the system performs an active learning action to execute the output setting initiated by the user over a passive learning action
(Continued)

triggered by a change in sensor data with respect to the changing environment. In other event, the present system performs passive learning action with respect to the changing environment and also any comparative data from similar user of a particular instance. The present invention also relates to a power management unit and how to use the same in a garment.

10 Claims, 13 Drawing Sheets

(51) Int. Cl.
*A41D 13/005* (2006.01)
*G05B 13/02* (2006.01)
*G06F 1/16* (2006.01)
*G06F 1/26* (2006.01)
*G06N 5/00* (2006.01)
*G06N 5/04* (2006.01)

(52) U.S. Cl.
CPC ............... *G06F 1/163* (2013.01); *G06F 1/26* (2013.01); *G06N 5/003* (2013.01); *G06N 5/04* (2013.01); *G06N 20/00* (2019.01)

(56) References Cited

U.S. PATENT DOCUMENTS

| | | | |
|---|---|---|---|
| 2008/0191045 A1* | 8/2008 | Harter | G05D 23/1904 236/46 R |
| 2010/0037158 A1* | 2/2010 | Commarford | G06F 3/04892 715/764 |
| 2014/0070957 A1 | 3/2014 | Longinotti-Buitoni et al. | |
| 2014/0277220 A1* | 9/2014 | Brennan | A61N 1/0452 607/3 |
| 2014/0375704 A1* | 12/2014 | Bi | G09G 3/3275 345/694 |
| 2016/0189039 A1 | 6/2016 | Leppanen et al. | |
| 2016/0278444 A1 | 9/2016 | Jordan et al. | |
| 2016/0363075 A1* | 12/2016 | Larocca | F02D 41/26 |

OTHER PUBLICATIONS

International Search Report of PCT/IB2018/054415 dated Oct. 31, 2018.

Office Action of corresponding European Patent Application No. 18820339.2 issued by European Patent Office dated May 18, 2022.

* cited by examiner

SYSTEM AND METHOD OF MACHINE LEARNING AND AUTONOMOUS EXECUTION ON USER PREFERENCES FOR USE IN GARMENTS

CROSS-REFERENCE TO RELATED APPLICATIONS

This application is a 371 application of International Patent Application No. PCT/IB2018/054415 filed Jun. 15, 2018, which claims priority from the U.S. provisional patent application Ser. No. 62/521,546 filed on Jun. 19, 2017, the Hong Kong patent application number 17109940.3 filed on Sep. 29, 2017, and the China patent application number 201820523929.6 filed on Apr. 12, 2018, and the disclosures of which are incorporated herein by reference in their entirety.

FIELD OF THE INVENTION

The present invention relates to machine learning and autonomous execution on user preferences for use in garments, hats, helmets, gloves, shoes, and other clothing, headgears, and footwear, collectively called smart garments. In particular, the present invention relates to smart garments that incorporate computer processing and environmental sensing capabilities with temperature control, heating, and cooling electronics components. The present invention also relates to a power management unit for use in the smart garments.

BACKGROUND OF THE INVENTION

There exists a number of heating garments on the market. They operate with users' input from knobs/button, and/or from user's input via connected mobile electronic devices. One of the disadvantages of such devices is that users need to keep on accessing the buttons or their mobile phone when using such clothes in order to manually configure temperature settings, which may not be convenient since most of the time, such clothes have been designed for outdoor activities (sport or professional use cases). For instance, a user skiing may find it difficult to access the controlling knobs/buttons on his clothes while skiing, or even more impractical to have to constantly input the commands via an application on his smartphone. Therefore, there is an unmet need for a smart garment which incorporates a system that can learn and execute a user's preferences and automatically respond to the internal and/or external changes without user intervention.

In addition, smart clothes currently on the market mostly use an integrated or specific dedicated power source (battery/power bank). The main reason is that non-specific power banks from the market would turn to off mode when idle for a short period, hence requiring the user to re-start them before they can operate their electric textile. The power bank may also go idle during usage cycles, such as heating cycles: once a set temperature is reached, the current is no longer drawn until the temperature has dropped to a set low level.

One solution is to send a pulse signal into heating elements at regular intervals, based on current detection and/or temperature detection. One such system has already been described in the PCT patent application publication number WO2017000597A1. However, it still remains some rooms for improvement. A new power management unit for use in a smart textile is therefore needed

SUMMARY OF THE INVENTION

Accordingly, one objective of the present invention is to provide a system which learns from the user's behavior, in relation to the other data constantly received and processed, as well as from historical data from other similar users. The present system can also execute control commands such as those to the heating and/or cooling elements in lieu of the user. Hence, the user can fully focus on his own activity instead of on operating the system and manually monitoring and changing his heating and/or cooling settings both for activated zones and intensity.

Therefore, in a first aspect of the present invention, provided is a system generally comprising a sensing module embedded in various locations in a garment comprising a plurality of sensors; optionally a user input panel for controlling power supply, power level and locations where the power is supplied to in the garment, and/or a user control interface provided by a mobile application that can perform the same function as the optional user input panel, and/or any kind of built-in electronics including one or more sensors and/or mechanical device that can turn into instructions, signals and/or behavioral information according to the user's motion or preference, e.g., one or more built-in sensors sensing a change in position of the mechanical device comprising one or more of a zipper, Velcro, buttons, button clips, clips, magnetic clips, and buckles within a time interval, where the change in position of the mechanical device triggers the generation of an instruction or signal for controlling the output while the behavior of the user at that particular instance is stored in the system; an electronic printed circuit board (PCB) comprising an integrated circuit (IC), memory, and various computer processors comprising sensor data processor, power control processor, data storage processor, data exchange processor, optionally a wireless communication module, and optionally an accelerometer, gyroscope, magnetometer, and/or a global position tracking system (GPS); optionally an output device comprising heating and/or cooling components which can be in a form of a heating and/or cooling pad, or an output signal transmitter to transmit a signal from the system to control any other forms of heating elements such as heat seat, cooling elements such as air conditioners, air purifiers, special respiratory system, etc. detachable or external to the garment, and said detachable or external element being connected to the PCB via electrical wires or wirelessly, e.g., a temperature control system external to the garment; and a power source connected to the PCB which can be a power bank or other rechargeable battery, or a power network with wires connecting different parts of the garment, or a power supply connected wirelessly to the system via electrical induction.

In one embodiment, the plurality of sensors includes but not limited to temperature sensor, a pressure sensor, and a humidity sensor. An anemometer may also be included into the present system. The number and the types of sensors can be customized for different situations. In the present invention, said temperature sensor can detect the skin and body temperature of the user while the external air temperature can also be detected by said temperature sensor; said pressure sensor can detect the external pressure according to the altitude where the user is located; said humidity sensor can detect the humidity of the user's skin and also the external air humidity; said anemometer can detect the wind speed from the direction opposite to where the anemometer is embedded into the garment, which is preferably the front of the garment but it can also be on both front and rear sides of the garment. The sensors of the present system are configured to detect and measure the corresponding parameters in real-time mode or in periodic mode such as once every fraction of a second, few seconds, few minutes, 15 minutes, etc., depending on the user's preference. Each type of sensors can be embedded in more than one position in the garment and the sensor data output from each type of sensors can be individual data or average data of various positions in the garment, also depending on the user's preference. The present system optionally includes a display panel on the garment to display the sensor data in real-time or periodically or the data be displayed on a smart device which is connected with the garment physically or wirelessly, or displayed on both the display panel of the garment and in the smart device that is connected to the garment physically or wirelessly. Since the sensors are embedded into a garment, the sensors can be made of flexible materials with sensing circuitry which can withstand certain degree of bending and stretch.

In another embodiment, the user input panel of the present system comprises a number of knobs, buttons, and/or multi-touch screen for controlling the power-related functionalities including but not limited to power on/off, power level, and where to supply the power in the garment/system. The user can control the power supplied to the whole or part of garment which is embedded with different components of the present system. The user can also control the level of the power supplied to a designated area, e.g., the heating or cooling component, of the present system, in order to control the temperature of the garment according to the user's preference. Said user input panel optionally includes the aforementioned display panel for displaying the sensor data received from the plurality of sensors and other information such as weather conditions, time, date and location, etc. Said user input panel is connected to the PCB of the present system with wires.

In other embodiment, the sensor data processor in the PCB of the present system is electrically connected to the plurality of sensors to receive, process and respond to the sensor data from the plurality of sensors. Said sensor data processor can send a response to the corresponding sensor(s) to provide optimization, correction of errors, and/or averaging of multiple points of data recorded. Said sensor data processor can also send the received and/or processed data to different parts of the present system or to an external device such as a smart device or a third-party sensor or a third-party database, data center or server. The sending of the received and/or processed data from the sensor data processor to any of the foregoing designations can be via a physical means such as wires and data exchange processor, or wirelessly via a wireless network.

In yet another embodiment, the power control processor in the PCB of the present system is configured to receive the power control instructions from the user input panel and respond to the instructions by sending commands to the power source to control which component and level of power to supply to in the garment. The power control processor may also include one or more capacitors for storing energy from the power source. The power control processor is electrically connected to the user input panel and the power source. It can optionally be connected wirelessly to a power control panel of a smart device via a wireless network.

In one other embodiment, the data storage processor in the PCB of the present system is configured to store data received from the sensors directly, the processed data by the sensor data processor, and/or the sensor data from a third-party sensor or data center or server. The data storage processor serves as a local storage of the sensor data. In the case of storing sensor data for the purpose of passive learning process of the present system, the data storage processor is configured to store the current data as temporary data point for comparing with the sensor data of the same kind whether the temporary data may exceed certain degree of difference in order to let the IC in the PCB to decide whether to trigger a timer to count down the time within a period of time or start a new cycle of passive learning process. It can also export sensor data to a third-party database, data center, server, or other computing device. Apart from sensor data, the data storage processor can also store data input by the user through the user input panel such as biometric data. In the case of storing and retrieving biometric data to and from the data storage processor, a higher level of security measures is implemented to ensure only an authorized person can access to and retrieve these data.

In one another embodiment, the data exchange processor in the PCB of the present system is configured to exchange (including receiving and sending) data between different components among the present system or between the present system and any external device such as a third-party sensor, smart device, database, server and data center. In the cases where certain authentication of the user's identity or the authorized person's identity is required for exchanging the data, the data exchange processor is also configured to serve as an authentication processor in order to secure the access and retrieval of the data by a third-party. In some cases, the data may also be encrypted by said data exchange processor for said security purpose. Other data such as weather conditions at certain time of different locations can also be exchanged between the present system and a third-party source via said data exchange processor.

In yet one other embodiment, the IC in the PCB of the present system is configured to decide and execute the active and passive learning processes of the present system in response to the user's preferences and the change in sensor data according to the internal (e.g., user's body temperature, skin humidity, etc.) and the external (e.g., temperature, humidity, atmospheric pressure, etc.) factors. The IC in the PCB can also make adjustment, correction of errors and calibration to the data received from the sensors with respect to the similar data exchanged between the present system and a third-party source such as a third-party sensor, database, data center, and server, at a specific instance. In the cases of executing the active or passive learning cycle, the IC in the PCB can include a timer for each of the learning processes in order to decide whether to execute the process or not within certain period of time according to the action that will trigger either the active or passive learning process. The IC can prioritize different learning actions between the active and the passive learning processes when two processes are concurrently triggered over the same time period and weigh an instant sensor data with an older set of data or a corresponding sensor data from a similar user in order to determine whether the instant sensor data may be prioritized over the older data or the corresponding data from similar user.

In yet one another embodiment, the one or more chips for wireless communication between the present system and a third-party device include but not limited to Wi-Fi to Near Field Communication (NFC) chip and/or a Bluetooth to NFC chip. Other wireless communication technologies applicable to the data exchange can also be implemented in the present system.

In other embodiment, the power source of the present system can be a power bank with high tolerance to extreme weather conditions such as high temperature fluctuation and high humidity. The power source can be rechargeable or non-chargeable. For rechargeable power source, it can be configured to have a port for another external power source to plug in. The power source is preferably a long-life but also with fast-charging characteristic such that the present system can be used in garments for extreme sports which require frequent power on/off and adjustment of power level. Optionally, a power saving mode can be introduced into the present system such that the power source can be saved when the user does not require higher power consumption functions such as heating or cooling the garment by the present system.

In a second aspect of the present invention, there is provided a method of how the present system is implemented to learn from user's experience and then executes the functions according to the user's preference. Specific embodiments of implementing the present method based on the system of the present invention will be illustrated in more details in the embodiments and examples described herein. In brief, the present method can be divided into two stages: data verification stage and operation stage. At the data verification stage, i.e., when the user first starts using the system or a return user uses the system again, the present system requests the first-time user to enter his/her personal information mainly including but not limited to mass, height, age, health conditions, location, hobbies, and/or ethnicity, etc., and enter the user settings such as the output function(s), output level and for how long the output may last, etc. After the personal data entry and setting up the user's preferences, the personal information and the user's preferences so entered will be stored in the local memory of the system as well as in an external memory or database such as a third-party server via wireless exchange for future use by the same user or as comparative data to other similar users. The present system is then fetched with data of similar users at a specific instance to that of the instant user from a third-party database or from a corresponding system of the same kind directly prior to the normal operation of the present system. On the other hand, if the user is a return user, the present system will allow the user to retrieve his/her personal data and/or previous user settings from the local memory or from an external memory or database after authenticating his/her identity. The user settings entered by the user at the data verification stage can be altered at later stage directly via other means such as by a mobile device wirelessly connected to the present system or by other devices electrically connected to the present system.

After the data verification stage, the present system will enter into a normal operation mode. At the normal operation stage, the present system first determines how the user setting is changed, whether it is by the user or by the fluctuation of the data from the sensors over time. In the case where the change in user setting is due to the user's initiative, the present system will perform an active learning process after a period of time counted by a timer. The timer subject to calibration is triggered by the user's initiated change and it waits until the user has finished changing the user setting within that period of time to perform the active learning action. If the user has performed any subsequent action before that period of time has lapsed, a new cycle of the active learning process will start and the timer will be reset. This mechanism ensures the final user setting changed by the user is accurately registered in the system.

Alternatively, if the change in user setting is due to the change of sensor data from a previous time point to the current time point, the present system will perform a passive learning process. Similar to the active learning process, once the present system determines that the user setting is changed due to the change in sensor data from a previous time point to a current time point, a timer for counting down the time for the passive learning to perform is triggered. Unlike the change of user setting at the user's initiative, the sensor data at the current data point is stored temporarily as reference to a subsequent set of sensor data to be detected at the next data time point. If the data at the next time point exceeds a certain threshold which is the maximum tolerance level of the difference between two data points, the passive learning cycle will start over again, meaning the timer will be reset. This mechanism reduces inaccurate learnings due to small fluctuation in the corresponding sensor data between any two data points in a relatively short period of time.

Active learning action, i.e., user setting changed at user's initiative, takes priority over passive learning action at any time during the passive learning process, meaning the timer for the passive learning process or any cycle of the passive learning process will be canceled because of the interruption of the user's initiated active learning action. This additional feature of the present method ensures the user's preference be accurately reflected in a learned database of the system. At the same time, the present system performs an interference action by searching through the learned database for the closest data from either an older sensor data or a corresponding data from similar user to an instant sensor data change, in order to determine whether the instant sensor data may be prioritized over the older sensor data or the corresponding data from similar user in the learned database. The threshold of the change in sensor data set in the learned database is the same as that used in the passive learning process.

Another objective of the present invention is to provide a smart garment incorporated with an improved power management unit, an example of which is shown in FIGS. 7-11. Said power management unit comprises a wire or wireless connection to a power bank, at least one light-emitting diodes (LED), at least one button or knot for controlling, adjusting and/or selecting one or more of the following functions: the power on/off; temperature level of a temperature control element; and/or operation mode of the temperature control element, a power circuit board (PCB), and optionally a gyroscope sensor for controlling, adjusting and/or selecting one or more of the afore-mentioned functions other than the at least one button or knot. FIG. 12 illustrates a method of how to use said power management unit to control/manage the power supplied to the smart garment. The method includes the following steps:

(1) The power management unit is connected to the power bank;
(2) A first LED blinks at regular time interval;
(3) After the user of the smart garment presses the first button or knot and holds it for a first period of time, the first LED stops blinking and becomes "on" mode, and the temperature control element is turned on simultaneously;
(4) A second LED is "on" as default after the first LED becomes "on" mode and it stays as "on" mode for a second period of time after the temperature and/or the operation mode of the temperature control element is/are selected by pressing the second button or knot;

(5) After the second period of time expires, the second LED blinks at a regular time interval until the gyroscope sensor senses a motion of one of the user's body parts in any of the 3-D planes, or until the user directly presses one of the buttons or knots without holding; otherwise, the second LED will not stop blinking;

(6) If the gyroscope sensor has sensed the motion of that one of the user's body parts in any of the 3-D planes, the second LED will return to the default "on" mode.

In step (4), if the second button or knot is pressed and then held for a third period of time, it will switch off the power of the temperature control element and the first LED will blink at that regular time interval again.

In an embodiment, the first and/or the second LEDs blinks/blink at every 10 seconds.

In other embodiment, the first, second, and/or third period of time is from 5 seconds to 10 seconds. Preferably, the second period of time is 10 seconds.

In another embodiment, the one of the user's body parts is the wrist of the user where the gyroscope sensor is disposed in or on the smart garment, wherein the wrist can be left or right wrist, and the motion of the wrist can be any planar motion executed by the condyloid joint of the wrist, for example, rotating the wrist in clockwise or anti-clockwise direction.

In yet another embodiment, the different states/modes of any of said LEDs can be customized according to user's preference to represent different operational state or stage of the power management unit, e.g., in step (2) of the present method, the blinking of first LED for a regular time interval can be changed to a "stand-by" LED mode followed by becoming "blinking" mode in step (3) after the user of the smart garment presses the first button or knot and holds it for a first period of time.

These and other examples and features of the present invention and methods will be set forth in part in the following Detailed Description. This Summary is intended to provide an overview of the present invention, and is not intended to provide an exclusive or exhaustive explanation. The Detailed Description below is included to provide further information about the present disclosures and methods.

BRIEF DESCRIPTION OF THE DRAWINGS

Embodiments of the present invention are described in more detail hereinafter with reference to the drawings, in which.

DETAILED DESCRIPTION OF THE INVENTION

Figure 1:
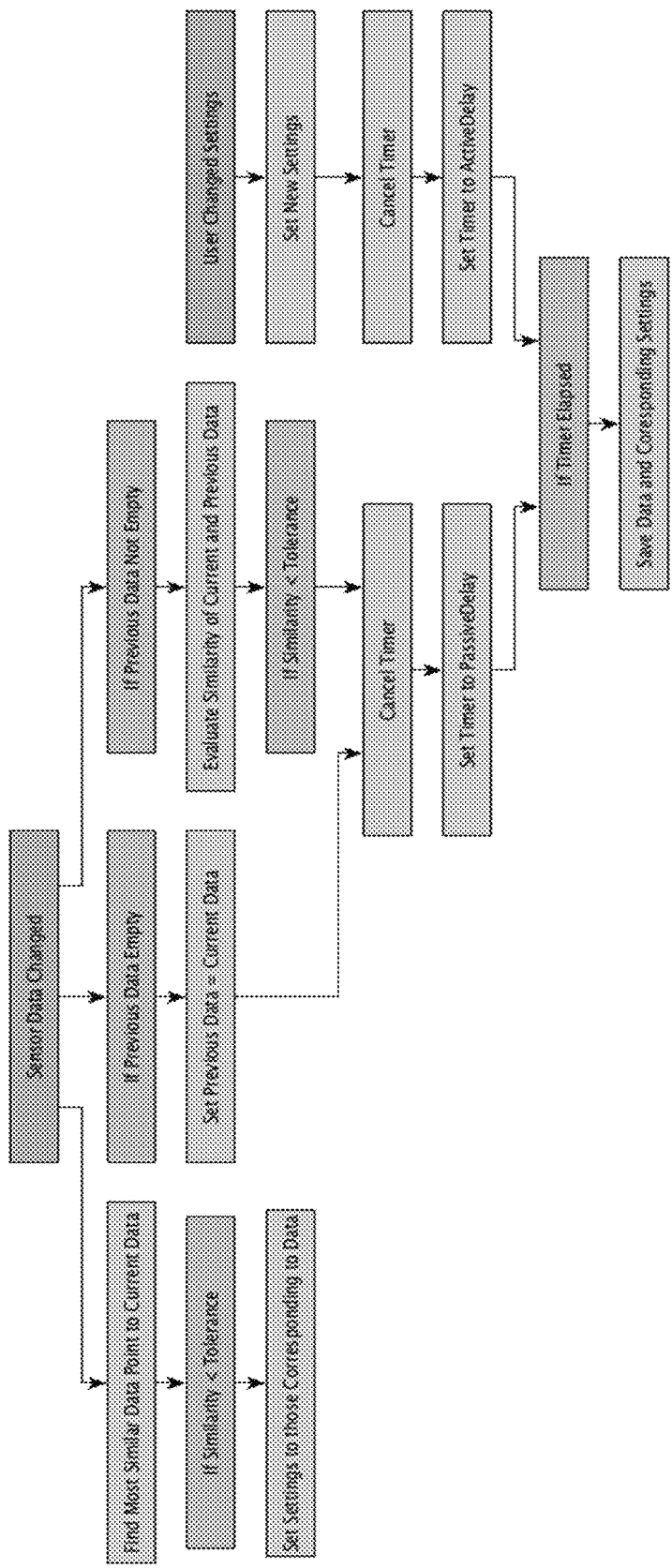
FIG. 1 is a flowchart showing how the present system is started by a user in respect of the user's personal data and fetched with other external data according to certain embodiments of the present invention.

The present invention is not to be limited in scope by any of the following descriptions. The following examples or embodiments are presented for exemplification only.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a concentration range of "about 0.1% to about 5%" should be interpreted to include not only the explicitly recited concentration of about 0.1 wt. % to about 5 wt. %, but also the individual concentrations (e.g., 1%, 2%, 3%, and 4%) and the sub-ranges (e.g., 0.1% to 0.5%, 1.1% to 2.2%, and 3.3% to 4.4%) within the indicated range.

As described herein, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Definitions

The singular forms "a," "an" and "the" can include plural referents unless the context clearly dictates otherwise.

The term "about" can allow for a degree of variability in a value or range, for example, within 10%, or within 5% of a stated value or of a stated limit of a range.

The term "Sensor Data" or "SD" refers to data from sensors embedded into the garment, fetched from external hardware connected via wireless or wired means, and/or data from the Internet.

The term "User Body" or "UB" refers to an aggregate of data about the user's body including but not limited to mass, height, Body Mass Index (BMI), body dimensions, date of birth, gender, health conditions, location, hobbies, tastes and preferences, and ethnicity.

The term "Similar Users" or "SU" refers to a list of users with similar UB to the current user.

The term "User Settings" or "US" refers to an aggregate of all the modes set on all heating and/or cooling outputs (includes zones activated and heating/cooling modes), including but not limited to their state (On/Off) and/or their output level at a specific instance.

The term "Data Point" or "DP" refers to an aggregate of all the SD at a specific instance.

The term "Temporary Data Point" or "TDP" refers to DP temporarily stored when PLD is triggered.

The term "Learned Database" or "LD" refers to a data structure containing a list of corresponding DP and US.

The term "Fetch Similar Users" or "FSU" refers to an addition of the DP and corresponding US of SU to the LD.

The term "Learning Action" or "LA" refers to an addition of a new DP and corresponding US to the LD.

The term "Current Data" or "CD" refers to an aggregate of all the current SD.

The term "Inference Action" or "IA" refers to an automated change of current modes on heating and/or cooling outputs by finding the closest DP to the CD and changing the modes to the US corresponding to that DP.

The term "Reference Tolerance" or "RT" refers to a fraction or decimal value subject to calibration indicating the maximum difference allowed between a DP and the CD for an IA to take place.

The term "Precedence Tolerance" or "PT" refers to a fraction or decimal value subject to calibration indicating how to prioritize data in the LD during an IA according to how new it is. Generally, newer data will be prioritized over older data.

The term "Similar User Tolerance" or "SUT" refers to a fraction or decimal value subject to calibration indicating how to weigh data in the LD during an IA that is added via FSU compared to data added via LA. Generally, data added via LA is prioritized over data added via FSU.

The term "Maximum Discardable" or "MD" refers to a data structure indicating how many and which SD can be disregarded in the computation of how close a DP and a CD are.

The term "Active Learning Action" or "ALA" refers to an LA performed after the user has changed his settings.

The term "Active Learn Delay" or "ALD" refers to a timer subject to calibration that waits until the user has finished changing his settings before performing an ALA.

The term "Passive Learning Action" or "PLA" refers to an LA performed after the CD has been changed and the user has not altered his settings, allowing the system to learn user preferences with near fluid granularity.

The term "Passive Learn Delay" or "PLD" refers to a timer subject to calibration that wait until the CD is stable before performing an PLA.

The term "Temporary Data Point" or "TDP" refers to a CD stored in the LD when PLD is triggered for comparing with the SD at the next DP to determine whether a PLD needs to be restarted with reference to RT.

The term "garment" used herein can refer to typical garment, any types of clothing including but not limited to zip-top, jacket, footwear, headgear, any form of gear worn by or attached to a part of the user's body, and any types of accessories.

EXAMPLES

The embodiments of the present invention can be better understood by reference to the following examples which are offered by way of illustration. The present invention is not limited to the examples given herein.

Example 1

First Use

As illustrated in FIG. 1, upon first use the system asks the user to optionally enter information about himself/herself (UB). In other words, the system is able to learn by itself without the optional input by the user upon first use. From this information, the system will then perform an FSU, enabling intelligent automation before the user has even used the device himself/herself. However, if the user has used the system before in another article of clothing, he/she may retrieve his/her UB and LD directly from the servers. Certain authentication procedure may be implemented to authenticate the user's identity by the server or by the local data storage in order to let the system to retrieve his/her personal information therefrom before operation.

Normal Operation

Figure 2:
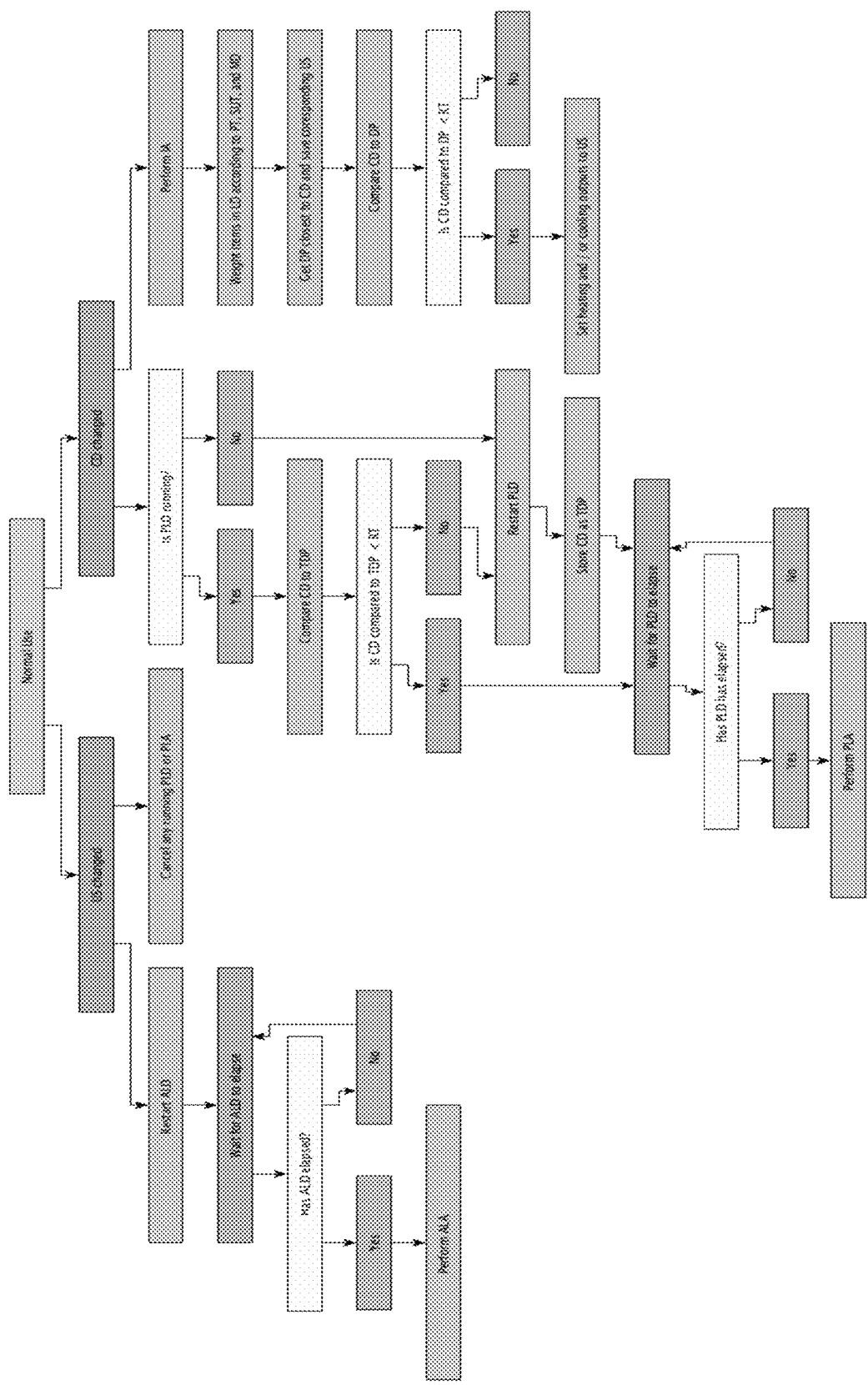
FIG. 2 is a flowchart showing a normal operation of the present system in response to different data input by the user and/or data from others and how the present system executes the user's preferences according to certain embodiments of the present invention.

As illustrated in FIG. 2, in normal operation, the user may alter the US directly on the garment via user input through input means such as, but not limited to, buttons, switches, knobs, or multi-touch screen on a display panel of the garment, or on a smartphone, tablet, website, wearable hardware and/or server that is connected to the garment via wired or wireless means. Upon such a change in the US, the ALD is triggered. Any subsequent action before the ALD has elapsed will restart ALD. Once the ALD has elapsed, an ALA will be performed. This process ensures that only the final US set by the user are registered to the corresponding DP in the LD.

Conversely, when the CD changes the PLD is triggered and the CD is stored as a temporary DP (TDP). Since sensor data may fluctuate every fraction of a second, each fluctuation will be compared to the TDP and if it exceeds the RT, the PLD will be restarted, reducing inaccurate learnings. Once the PLD elapses, a PLA is performed. If an ALA is triggered at any time during this process, the PLD and PLA will be cancelled, so that the user's preferences are accurately reflected in the LD.

At the same time when the CD changes, the system will try to perform an IA. In order to do this, it searches through the LD for the closest DP to the CD and factor in weights assigned by PT and SUT, as well as conditions specified in MD. If this match is higher than the RT, the settings will be set to the US corresponding to the matched DP.

Example 2

Figure 3:
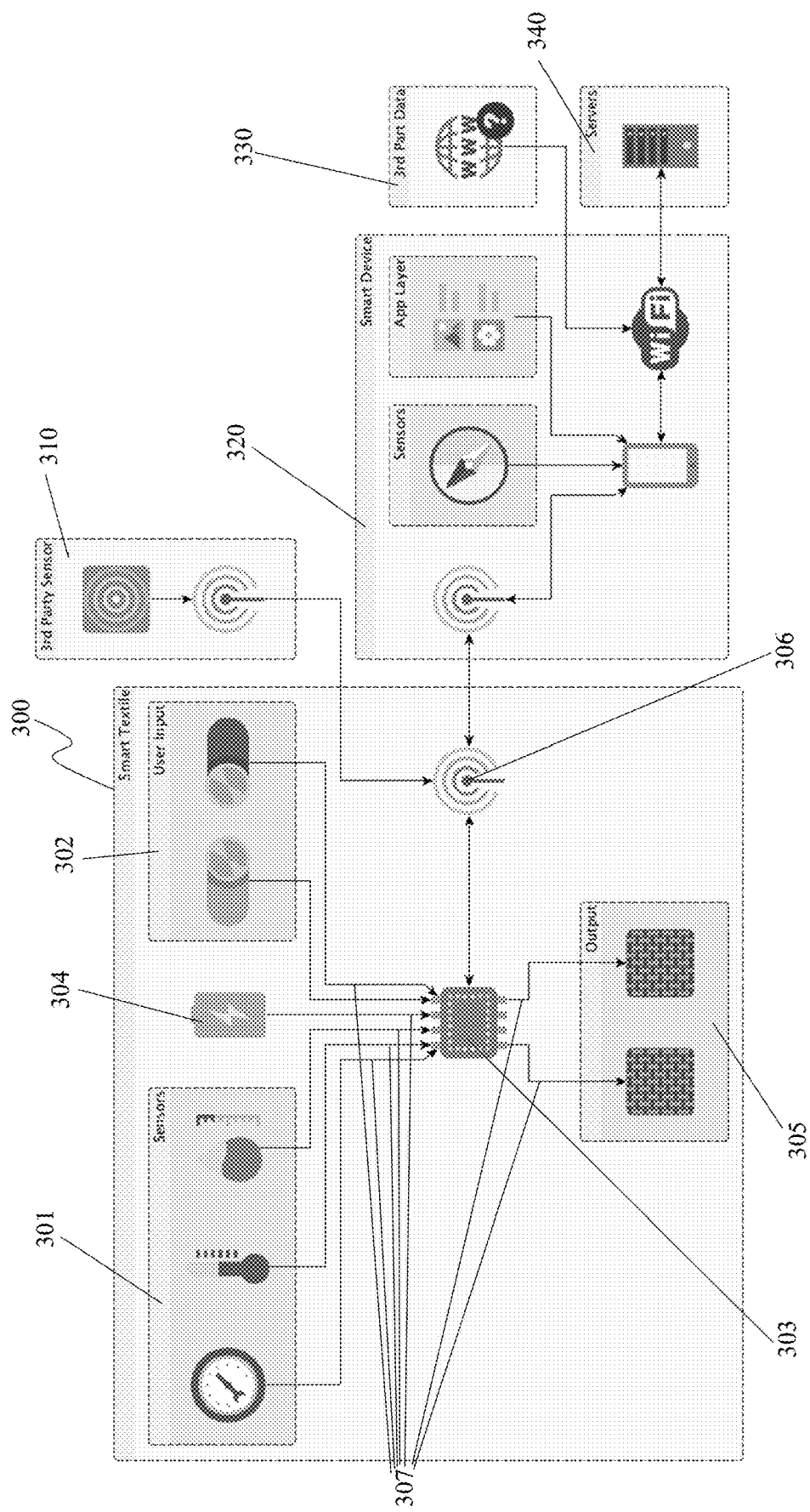
FIG. 3 shows a working example of how the present system is incorporated into a garment for heating and/or cooling according to an embodiment of the present invention.

Below is a working example of the present system in a smart garment:

FIG. 3 shows an embodiment of the present system automating a smart garment for heating and/or cooling. The smart garment (300), for instance, a zip top or a jacket, includes:

- a plurality of body sensors (301), such as heart beat rate/pressure sensor, body temperature sensors, body humidity sensors, as well as environmental sensors such as external temperature and external humidity;
- a number of knobs and/or buttons located on the garment surface (302), such as power On/Off, power level controls and area controls;
- an electronic printed circuit board (PCB) (303), with an integrated circuit (IC), memory, other components for data processing, storage, and wireless communication (such as Wi-Fi and/or Bluetooth). This PCB may also incorporate sensors such as an accelerometer, a GPS, and a Wi-Fi to NFC (Near field communication) chip or a Bluetooth to NFC chip (306);
- a plurality of pads (305) as the output for production and/or absorption of heat and/or cold;
- a plurality of power and signal wires/cables (307), embedded in the garment and/or attached to the fabrics, and connecting the various electrical elements, as well as their corresponding connectors;
- an external, and/or built in, power source (304), such as a power bank.

The present garment can be connected wirelessly to a smartphone (320), or other smart device such as a smartwatch, tablet or other device, which provides an application layer. This layer includes data processing, as well as a user interface, for the user's profile management, consultation of data, as well as data entry. In particular, the user may enter his commands directly from the application, such as On/Off, power level controls (change power to heating and cooling levels) and area controls (heating and cooling area activation and controls). The mobile application can also fetch data from the phone (or other smart device such as a smartwatch, tablet or other device), in-built sensors, such as accelerometers, gyroscope, magnetometer, and GPS, as well as data from the user's past history, as well as data from third parties on the cloud, such as local wind speed or climactic and weather conditions, as well as data from the system's servers, for instance, data correlated from other users.

Figure 4:
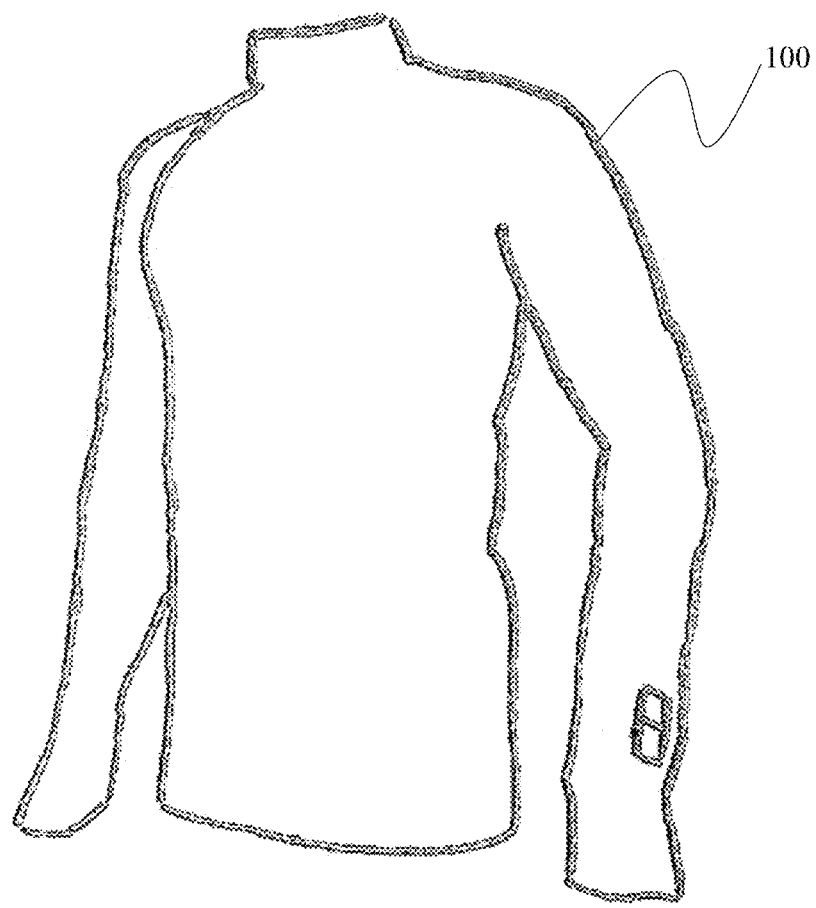
FIG. 4 is an exemplary garment integrated with the present system from a perspective view according to an embodiment of the present invention.
Figure 5:
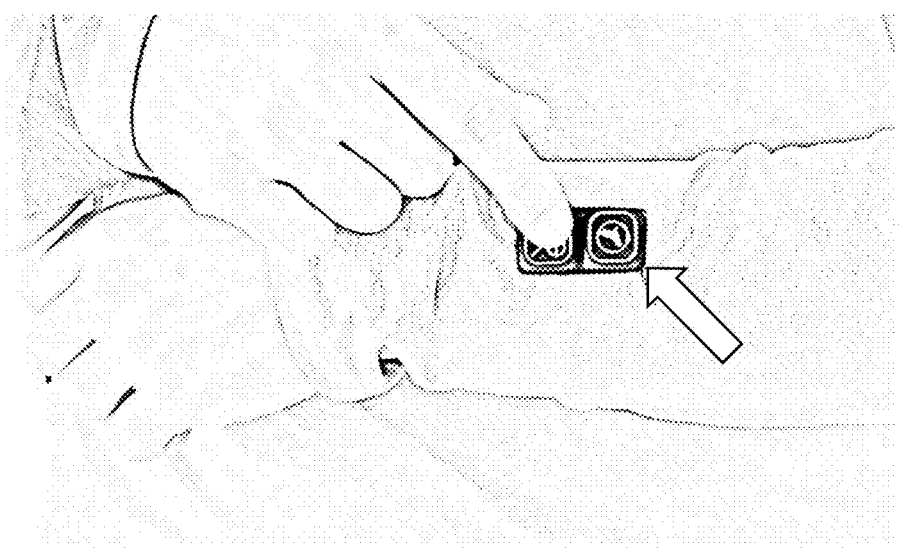
FIG. 5 shows another exemplary garment integrated with the present system from a close-up view on an optional user input panel attached onto one sleeve of the garment according to an embodiment of the present invention, where the block arrow indicates the location of where the user input panel is attached onto the garment.
Figure 6:
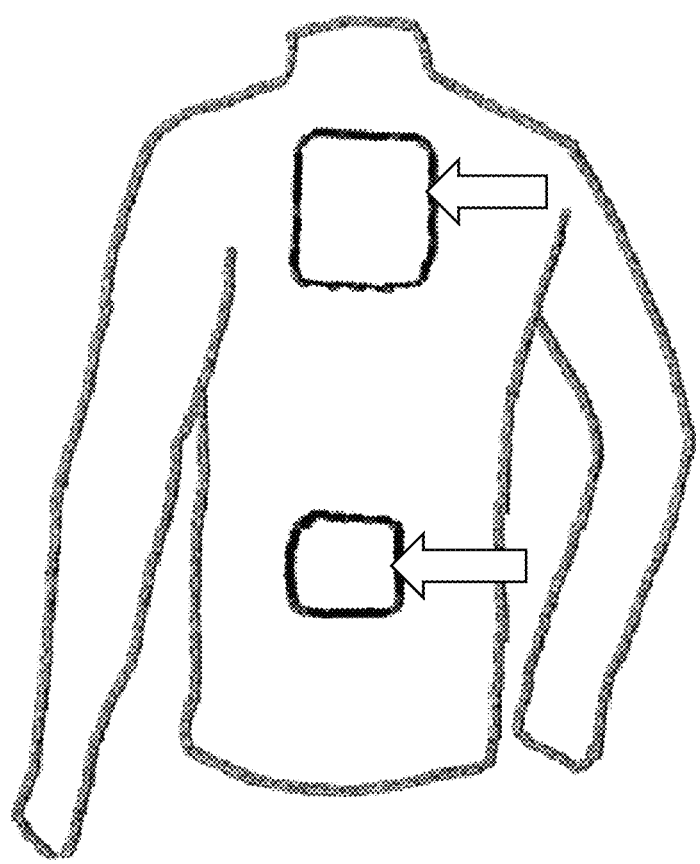
FIG. 6 shows yet another exemplary garment integrated with the present system from a rear perspective view on an output device embedded into the garment as a heating and/or cooling pad according to an embodiment of the present invention, where the block arrows indicate the location where the heating and/or cooling pad is embedded into the garment.

An example of the garment integrated with the present system is shown in FIG. 4, while the close-up view of the optional user input panel as a form of knobs or buttons attached onto the garment is indicated by a block arrow in FIG. 5 and a rear view of the garment where the heating and/or cooling pad as an output device of the system is embedded into the garment is indicated by block arrows in FIG. 6. They are not intended to limit the present invention to suit a particular type of garment or configuration but only to show that the present system is integral to any type of garment including but not limited to a zip-top as shown in FIG. 4.

In an event that a user uses the present garment for skiing, if the user is a first-time user, he/she is asked by the system to input his/her own personal data such as weight, height, age, health conditions, etc., into the system. He/she can manually input location or the GPS which is optionally embedded into the system is activated automatically once the system is started to detect his/her location before the system enters into normal operation stage. Without the user's input, the present garment is able to learn by itself from similar data from a third-party device stored in a database. For security concern, he/she may be asked to provide a user login details for future access to or retrieval of data from local memory or data storage or from a remote server. If the user is a return user, the user is asked to provide his/her latest login details for registering his/her own data into the garment from the server (340). Once the server recognizes the login details input by a return user, the garment will download the previously stored user data from the server via a wireless communication network, or will retrieve the user data from the local memory or data storage of the garment. In any case, the garment is fetched by the server (340) or a third-party device such as a third sensor (310) or third-party data center (330) with data from similar user of a specific instance, for example, under this instance, is a ski user with comparable personal data. The user may also be asked to input his/her preference of heating and/or cooling settings in the garment, e.g., keep the garment at certain temperature range when skiing; which part of the pads are activated; what power level is at certain part of the garment, etc. Alternatively, the system may be pre-set with the conditions for the heating and/or cooling output for the garment according to the data from similar user if the user does not provide such information at the data verification stage. The user, however, is allowed to change his/her user setting anytime during the operation stage of the garment.

After the data verification stage, the user can use the garment at its operation mode. During the normal operation stage, the garment is basically responsive to the sensor data from time to time. If at one time point the corresponding sensor data, e.g., temperature, pressure, humidity, wind speed, etc., detected by the sensors is over a reference difference between the instant record and the previous record at the previous time point, the system will automatically change the user setting and execute the corresponding output, e.g., increase or decrease the temperature of the pad in the garment, after certain period of time. In case where there is another record of sensor data which exceeds the reference value during that period of time, the count-down of a new cycle will start until there is no interruption or change of sensor data detected during a cycle. The time interval of each cycle can be adjusted according to user's preference, but the system is capable to detect fluctuation of sensor data in the degree of every millisecond, and the count-down of each cycle is achieved by a timer in the system.

Apart from the change in sensor data from time to time, the user may interrupt the cycle by inputting user setting with respect to his/her preferred temperature of the pad in the garment. The garment is configured to take user's preference as first priority over the change in sensor data in the output setting. That is, when the user feels like he/she need more warmth or cold in certain part of the body from the garment during skiing, he/she may adjust the pad temperature via a mobile application wirelessly connected to the garment or other means such as a button or switch or some physical means attached to or on the garment, such user's instruction to increase the temperature of the pad in the garment will take priority over the change of the setting due to the sensor data difference exceeding a reference threshold.

The data whichever received from the sensors or input by the users are stored in the local data storage of the system. Comparison and matching of the data so received and stored in the system of the garment with other comparative data from similar user or from a server are also performed almost concurrently or subsequently to each data collection cycle by the system to ensure the data accuracy and the consistency between the output and the user's preference at a specific instance.

The data stored in the local memory or data storage of the garment can be used for the next time skiing activity of similar kind and conditions by the same user. Such data can also be shared with similar users of the same model of garment and/or stored in the server as a database. A matrix of data sets including both sensor data and body characteristics of a particular user is preferably stored in the database of the server for analysis and optimization of the system for different applications.

Example 3

Figure 7:
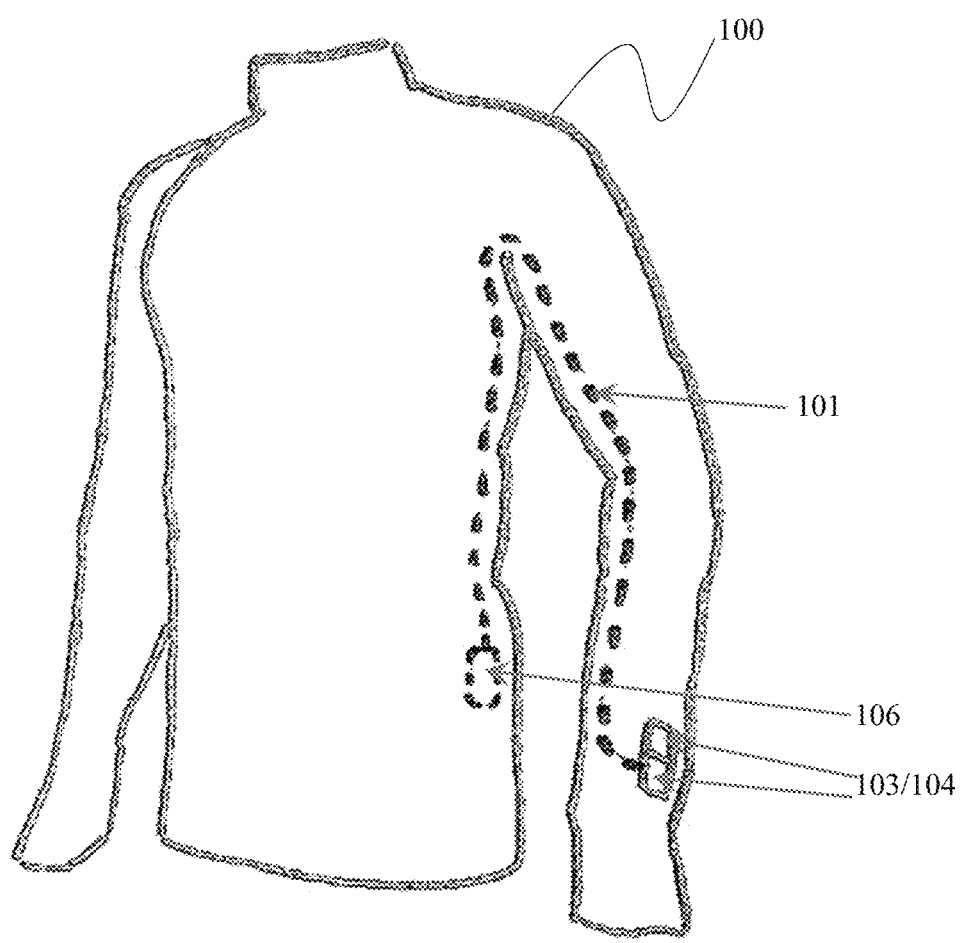
FIG. 7 is a perspective transparent view from the front of the smart garment incorporated with the power management unit according to an embodiment of the present invention.

FIG. 7 shows one of the preferred embodiments of the smart garment (100) incorporated with the power management unit of the present invention, which is a zip-top. However, it should be understood that the smart garment of the present invention is not limited to zip-top but can also include other types of clothing or garment such as jacket, footwear, headgear, any form of gear worn by or attached to a part of the user's body, and any types of accessories. In addition, the output of the power management unit, i.e., the temperature control element, is only an example of the output which can be controlled by the power management unit, but it should also be understood that the type of output is not limited to the temperature control element but can also include heating, cooling, massaging, vibrations, and/or any combination thereof. In FIG. 7, the power circuit board (PCB) (106) of the power management unit is hidden in the smart garment and connected with two buttons (103, 104) configured at the waist end of one of the sleeves of the smart garment through the wire or cable (101) hidden in the smart garment in order to control the power on/off of the power management unit and/or the temperature of the temperature control element according to the time duration of the pressure applied thereon by the users.

Figure 8A:
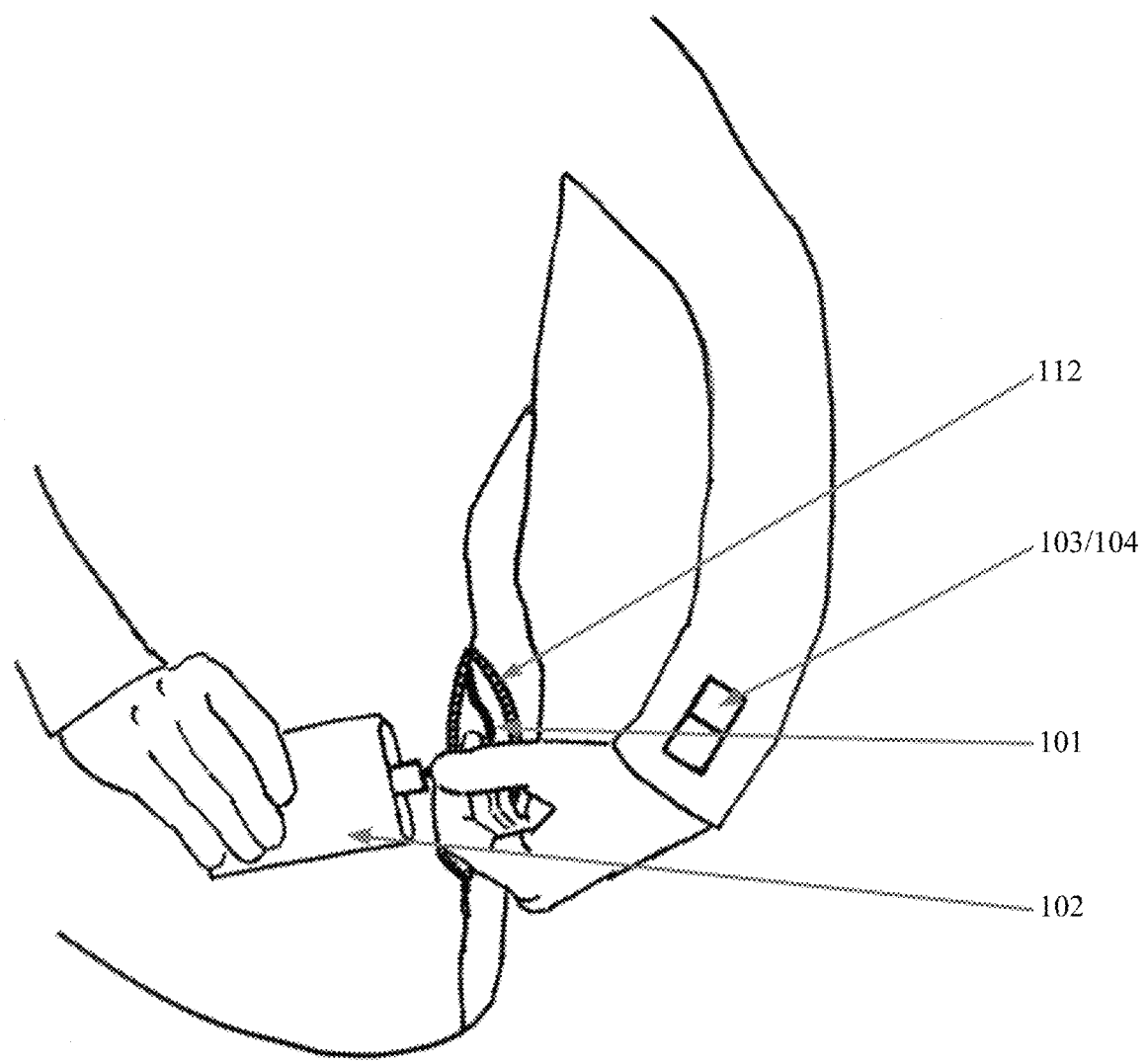
FIG. 8A and FIG. 8B are close-up perspective transparent views from the front of the smart garment respectively showing the status before and after the connecting cable connecting the power management unit to the power bank according to an embodiment of the present invention.

FIG. 8A shows an extendible wire or cable (101) which has been connected to the power management unit at one end and is open for connecting to a power bank (102) at another end. The wire or cable (101) can be configured with a USB-type port or alike such as micro-USB, or any other types of port that are available for establishing electric connection between two components. For carrying the power bank (102) which is connected to the power management unit and for hiding the extendible wire or cable (101), the smart garment can be configured to have one or more power bank pockets (112), wherein said extendible wire or cable (101) can be extended from a hole in the power bank pocket (112) to a distance that is capable of connecting with the power bank (102). Said power bank pocket (112) can be easily sealed or opened via any suitable mechanism such as zipper, Velcro, etc.

Figure 8B:
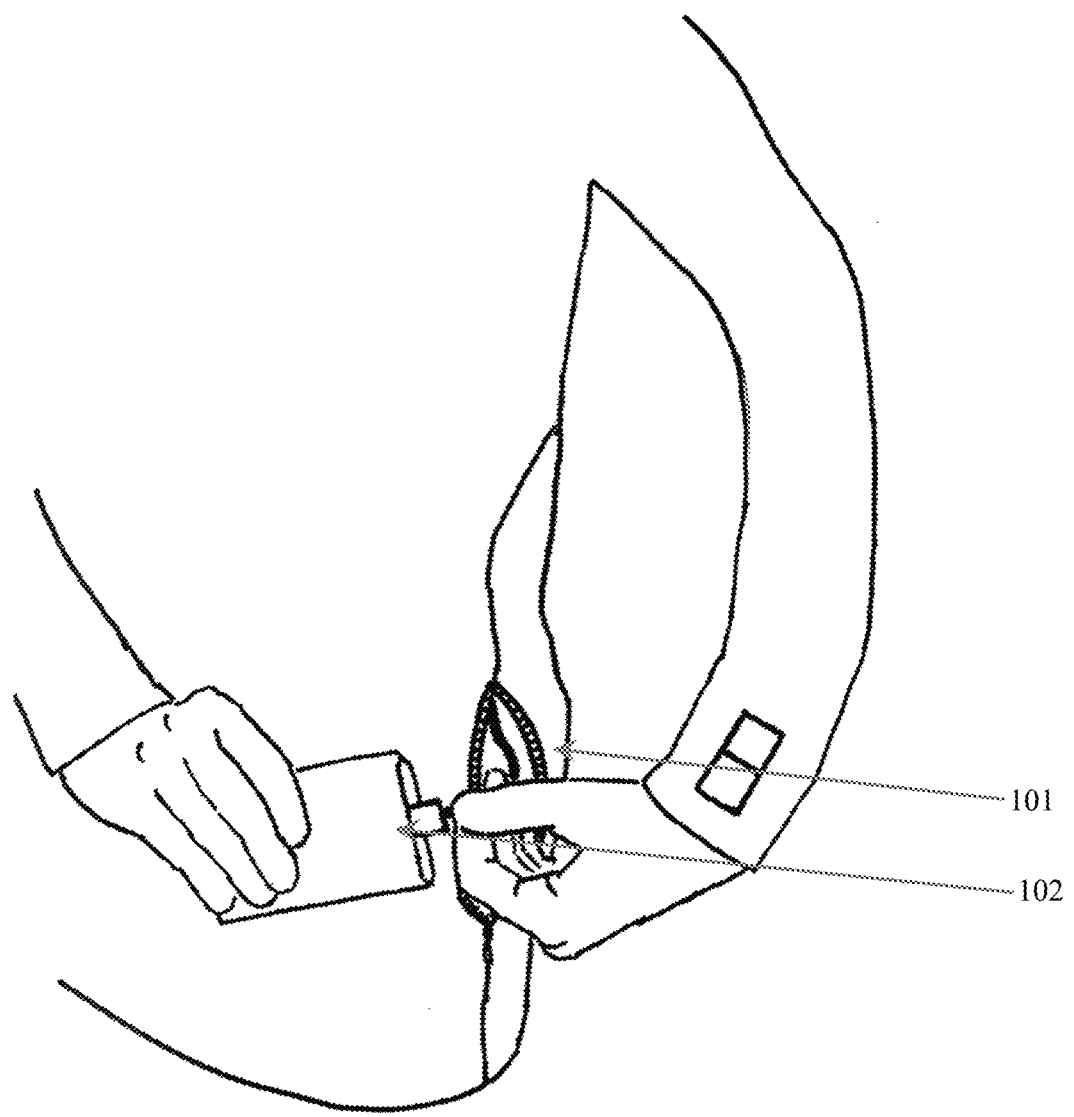
Figure 11A:
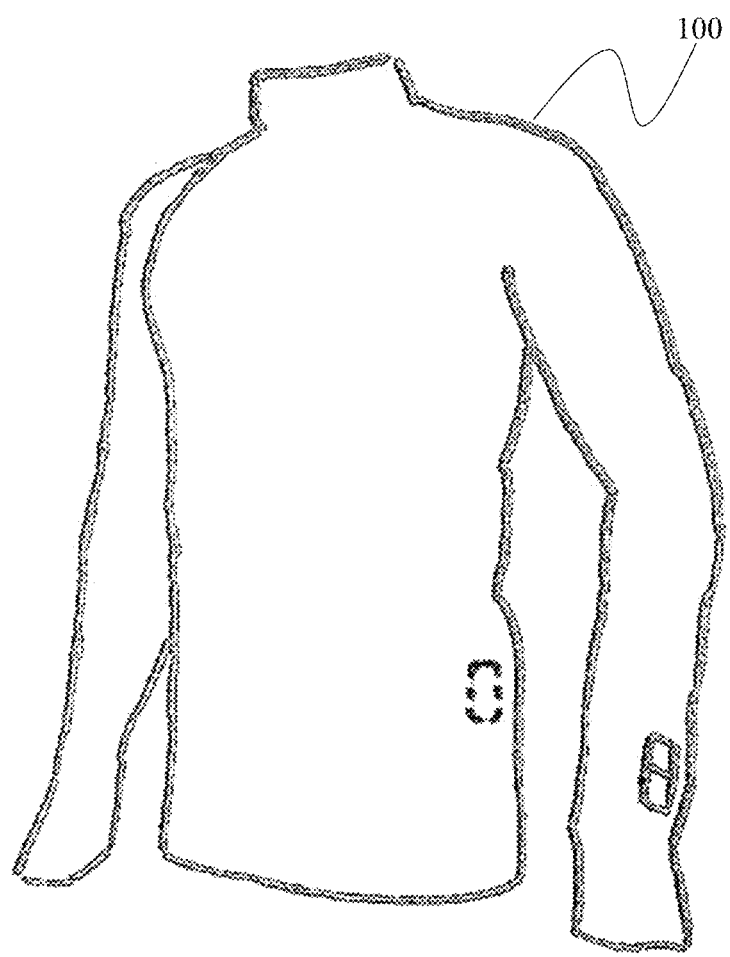
FIG. 11A is a perspective transparent view from the front of the smart garment according to another embodiment of the present invention.
Figure 11B:
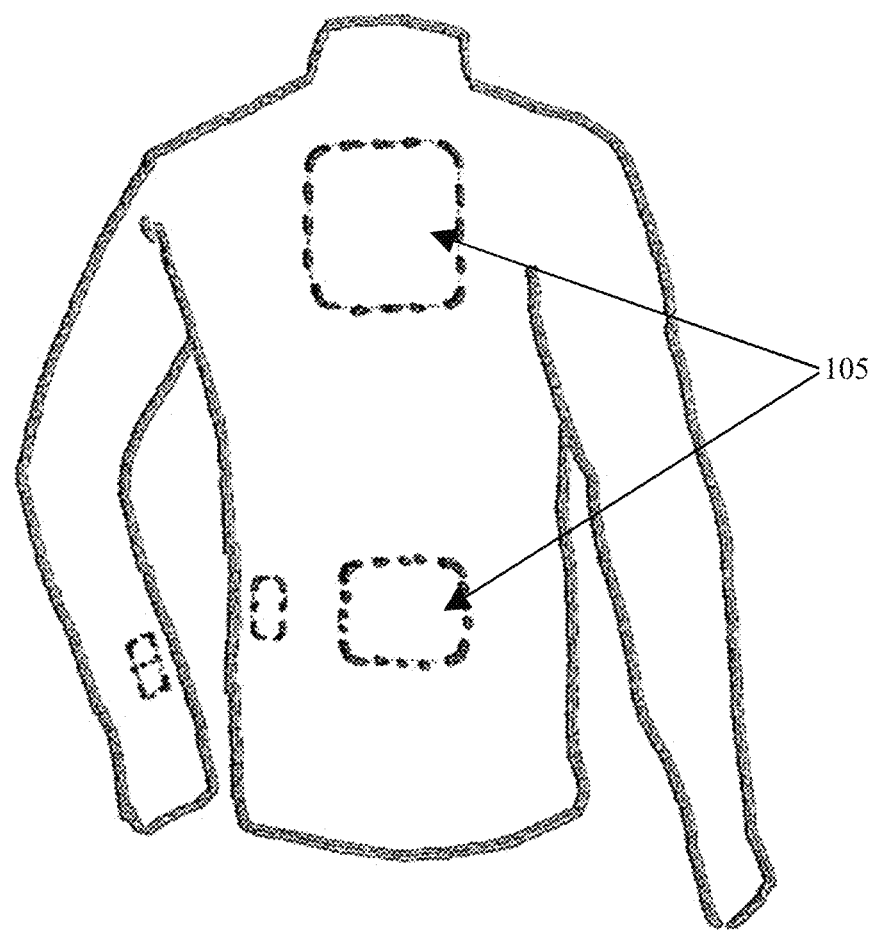
FIG. 11B is a perspective transparent view from the rear of the smart garment as shown in FIG. 11A according to another embodiment of the present invention, in which the temperature control element is configured in the form of heating and/or cooling pad(s)

FIG. 8B shows the wire or cable as shown in FIG. 8A be connected to the power bank at another end. It is possible that the connection between the power management unit and the power bank (102) is wireless, for instance, Qi induction, or the power is supplied from other electric/electronic component of the smart textile, through a power network or from any external power source. FIGS. 11A and 11B show the smart garment incorporated with the power management unit according to another embodiment of the present invention, wherein the connection between said power management unit and the power bank (102) comprises a wireless connection between the power bank (102) and the temperature control element (105), thereby wires or cables configured to connect the power bank or other components with the power management unit in the smart garment can be avoided.

Figure 9A:
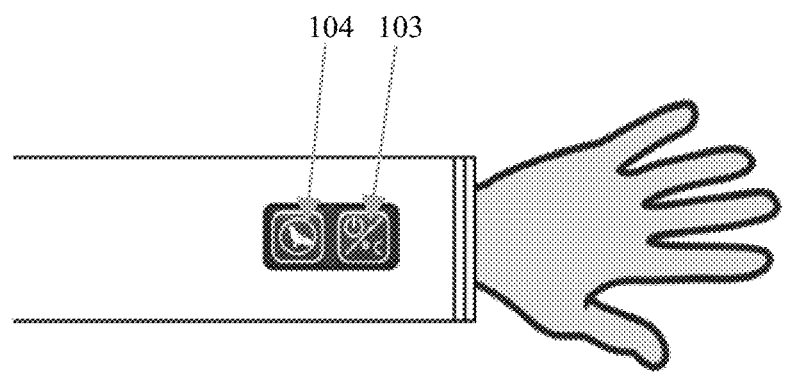
FIG. 9A is a top view of the buttons disposed on one of the sleeves of the smart garment as shown in FIG. 7 for controlling power on/off and/or selecting temperature and/or operation mode of the temperature control element according to an embodiment of the present invention.

FIG. 9A shows two of the buttons (103, 104) disposed close to the wrist end of one of the sleeves of the smart textile. The two buttons (103, 104) are not necessarily disposed next to each other on the same wrist end of the sleeve of the smart textile and each of them can include one or more functions. In this example, the two buttons (103, 104) enclose two respective LEDs (not shown in FIG. 9A). Part of the surface of the button is transparent to the light emitted from the LED enclosed therein. The respective LED is not necessarily enclosed in the button. Other form of physical association between the button and the respective LED is also applicable in the present invention. In a preferred embodiment of the present invention, one of the two buttons (103) is configured to be on "blinking" mode at default setting when the power management unit is just connected to the power bank. The button on "blinking" mode can be readily changed for controlling power on/off of the power management unit and/or selecting temperature of the temperature control element in terms of the duration of pressure exerted thereon by the user. In this example, a pressure sensor is incorporated into the button (103) in order to sense the pressure exerted by the user's finger. In another embodiment, it is possible to have only one LED which provides different indications with a range of colors, each having still and blinking signal(s). In other embodiments, it is also possible that other types of sensor or sensing mechanism is incorporated for sensing the user's command, for example, if the power on/off and/or temperature selection and/or operation mode selection is controlled through a touch screen control panel, the virtual buttons on the touch screen may be incorporated with a temperature sensor underneath the display of the touch screen. Since the power management unit is electrically connected to the temperature control element, controlling the power on/off of the power management unit is capable of controlling the power on/off of the temperature control element. However, it is possible that the power on/off of the temperature control element is under the control of a separate circuit which power is controlled by one of the two buttons. To control and/or select different adjustable parameters of the output using one of the buttons, an illustrative example is presented in FIG. 12 which will be described further in the following example. For example, as shown in FIG. 9A, one of the two buttons can be pressed and/or held by the user in order to control and/or select different adjustable parameters. In this example, if the user presses the operation mode control button (104) once, he/she can adjust the level within one particular mode. In another example, if he/she presses the button and holds it for a while, for example, for 5 seconds, the operation mode will be switched from one mode to another. After he/she releases the button, he/she can press again to adjust the level within another mode.

Figure 9B:
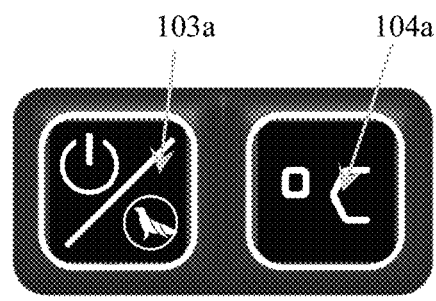
FIG. 9B is a top view of the buttons for controlling power on/off and/or selecting temperature and/or operation mode of the temperature control element according to another embodiment of the present invention.

FIG. 9B illustrates another example of the arrangement of the functions that the buttons can control, select, and/or adjust. In this example, the power on/off and the operation mode selection are controlled/selected by the same button (103a) while the level of the temperature of the temperature control element is adjusted by another button (104a). It is possible that one button or knot is configured to be used to control, adjust and/or select the power on/off, operation mode, and adjustable level of the output element.

Figure 10:
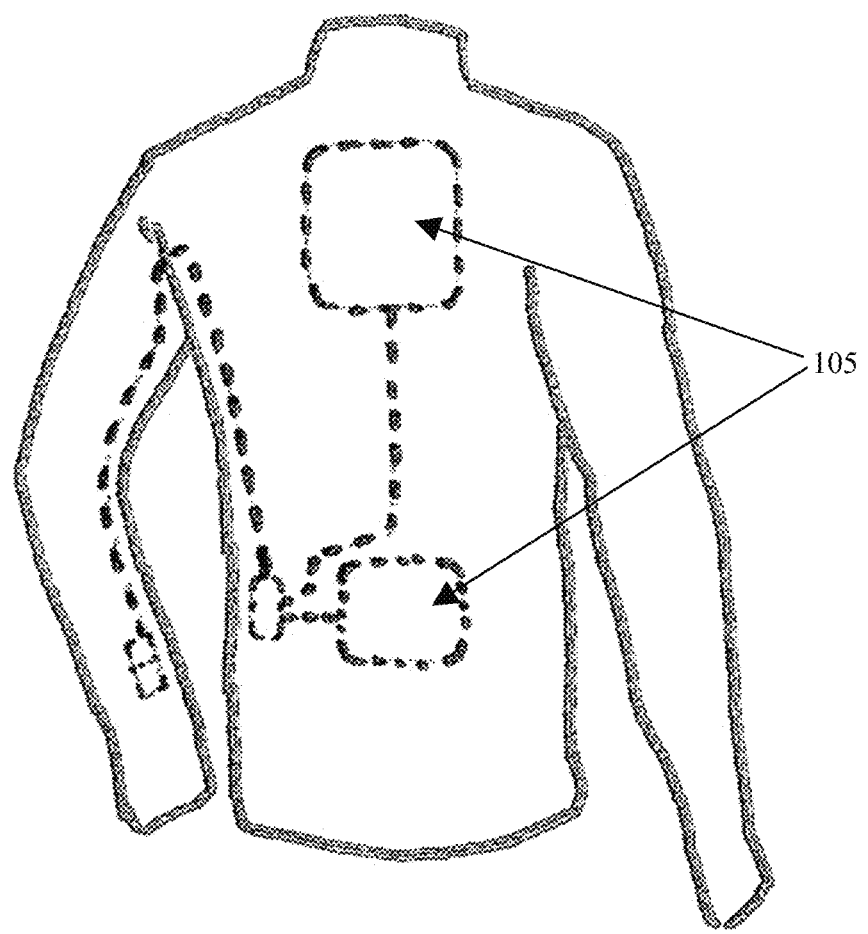
FIG. 10 is a perspective transparent view from the rear of the smart garment as shown in FIG. 7, in which the temperature control element is configured in the form of heating and/or cooling pad(s)

FIG. 10 shows the back side of the smart garment as shown in FIG. 7 where the temperature control element, in a form of two heating/cooling pads (105), is disposed. Once the button (104) for selecting and adjusting the operation mode and its level of operation is pressed, the temperature control element starts to execute the instructions according to the mode and corresponding level of operation as selected, unless the button (104) is being held for a sufficiently long period of time, e.g., 5 to 10 seconds. In one embodiment, when one pad is activated, the output power is sent to that pad; when two pads are activated, the output power is shared among the two pads in such a way that one pad receives the full power for a short time interval and then the other pad receives the full power for another short time interval under the power alternation. In another embodiment, the pads receive the power at the same time without alternation, depending on the amperage of the power bank or source. The output power in that another embodiment is split and allocated among the pads at equal or different power level, depending on the power demand of a particular pad.

Example 4

Figure 12:
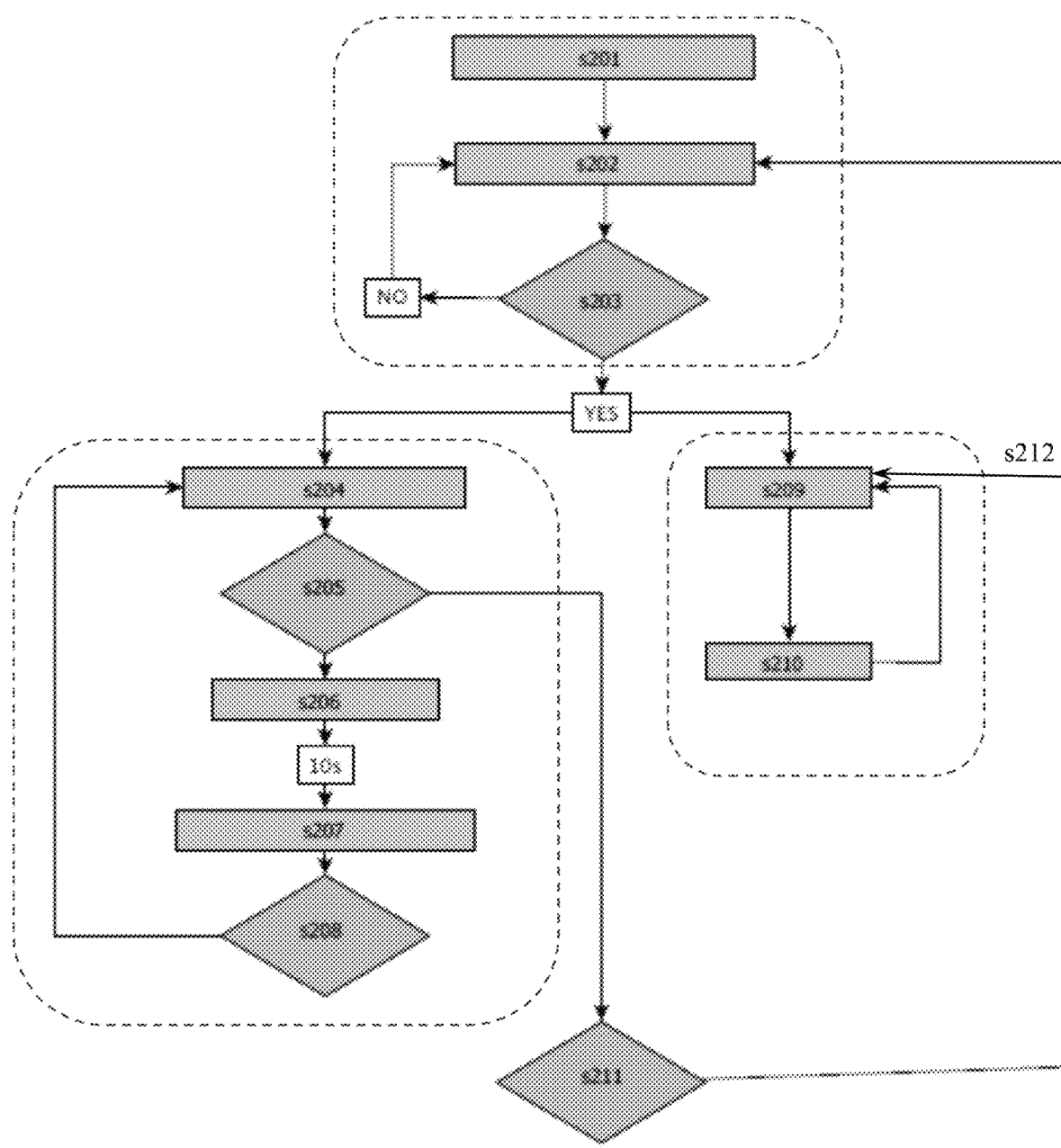
FIG. 12 is a flow diagram illustrating the method of using the power management unit for controlling the power on/off and/or selecting temperature and/or operation mode of the temperature control element according to various embodiments of the present present invention.

FIG. 12 shows the steps of how to initiate and operate the power management unit in the smart textile of the present invention. First of all, the power management unit is connected to a power source, e.g., a power bank, through a wire or cable (s201). After connecting the power management unit to the power bank, a blue LED blinks every 10 seconds (s202). An intervening event of the "blinking" mode of the blue LED is a long-press action on the button enclosing the blue LED by the user (s203). A sensor, e.g., a pressure sensor (not shown in figures), being incorporated into the button enclosing the blue LED may be used to sense the long-press action by the user such that it decides whether to switch on another circuit controlling the temperature control element or not. Depending on the user's or manufacturer's setting, the threshold duration for the long-press action to switch on another circuit varies, e.g., between 5 and 10 seconds. If the user presses the button enclosing the blue LED for sufficiently long time reaching the threshold, the circuit controlling the temperature control element will be switched on. Otherwise, the blue LED will remain in "blinking" mode, representing the smart textile is in ready-to-use state only. Another LED for signaling the operation mode of the temperature control element is switch on and stays as "on" mode according to the default setting after the blue LED is turned into "on" mode because of the long-press action by the user reaching the threshold duration (s204). Simultaneously, the circuit controlling the temperature control element is also switched on and becomes available to control the temperature control element embedded into or attached onto the smart textile to heat up or cool down (s209), subject to other sensing mechanism(s) of the smart textile. Said another LED can be enclosed in another button which allows the user to select the operation mode and/or adjust the level of the selected mode (s205). After selecting the desired operation mode and level of operation, said another LED is on for 10 seconds (s206) then it blinks every 10 seconds (s207) until a gyroscope sensor embedded into or attached onto the wrist end of one of the sleeves of the smart textile where the buttons are disposed senses a rotational motion of the user's wrist along any of the 3-D planes (s208). Said another LED will return to the default setting, i.e., "on" mode (s204), until it is intervened by another selection of operation mode and/or adjustment of operation level through pressing and/or holding said another button by the user. In the circuit controlling the temperature control element, after the circuit is switched on (s209), the temperature control element will be operated according to the selection of operation mode and/or adjustment of operation level made by the user (s205). The heating or cooling action of the temperature control element is paused when the surface temperature reaches the temperature level selected by the user or the temperature level corrected by other sensing mechanism(s) (s210). The circuit controlling the temperature control element will be switched off (s212) if the user holds said another button for sufficiently long duration when he/she is selecting the operation mode and/or adjusting the operation level, e.g., for 5 to 10 seconds (s211). If the circuit controlling the temperature control element is switched off, said another LED will be switched off and the blue LED will blink every 10 seconds again, meaning that the smart textile returns to ready-to-use state. The foregoing mechanisms are executed in at least a chip of the PCB of the power management unit.

The present invention may be embodied in other specific forms without departing from the spirit or essential characteristics thereof. The present embodiments and examples are therefore to be considered in all respects as illustrative and not restrictive. The scope of the present invention is indicated by the appended claims rather than by the foregoing description, and all changes that come within the meaning and range of equivalency of the claims are therefore intended to be embraced therein.

INDUSTRIAL APPLICABILITY

The present system is useful in garment with specific applications such as heating and cooling in specific instance such as skiing or professional diving which require regulation of the body conditions in an extreme environment. The active and passive learning mechanisms of the present system are also useful in intelligent automation of other articles apart from garment which also do not favor human manual micromanagement during operation but quick response to the environmental changes is required, e.g., space suit.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system with machine learning and autonomous execution on user preferences for use in a garment comprising:
   one or more sensors;
   an electronic printed circuit board (PCB);
   an internal or external power source, wherein said power source comprises a power bank and/or a rechargeable battery electrically connected to said PCB and other parts of the system or garment, or a power network connecting different parts of the garment, or an external power supply which is external to the system and connected to the system wirelessly; and
   an output device embedded into or attached onto the garment, or an output signal transmitter;
   wherein said sensors are embedded into the garment and electrically connected to the PCB, which are configured to generate sensor data;
   wherein said PCB comprises one or more computer processors and electronic circuities comprising a sensor data processor, a power control processor, a data storage processor, a data exchange processor, and optionally a wireless communication processor for wirelessly communicate with one or more third-party devices comprising a third-party sensor, and/or a data center, and/or a mobile device, and/or a server;
   wherein said output device comprises heating and/or cooling components being embedded into or attached onto a surface of the garment, or said output signal transmitter transmits an output signal from the system to control an external output device;
   wherein said PCB preforms learning actions comprising active learning and passive learning actions for changing output setting of said output device or modulating output signal to said output device; and
   wherein said active learning and passive learning actions are triggered by a change in output setting initiated by the user and a change in sensor data received from a corresponding sensor of the plurality of sensors which is over a reference value, respectively;
   wherein said computer processors and electronic circuities in the PCB comprise a first timer for counting down the time within a time period since the output setting is initiated by the user during the operation of the system, and a second timer for counting down the time within a time period since the change in sensor data is over a reference value during the operation of the system; and
   wherein when said first or second timer completes a round of count-down without any reset, the user's initiated output setting and/or the change in sensor data is/are stored in the data storage processor as a learned database.

2. The system of claim 1, further comprising an internal and/or external user input panel and/or interface;
   wherein said user input panel and/or interface is/are embedded into or attached to the garment, and/or provided by and executed in the mobile device and wirelessly communicates with said PCB, and/or as a built-in electronics including one or more sensors and/or mechanical device that can turn into instructions, signals and/or behavioral information according to the user's motion or preference;
   wherein said user input panel comprises one or more knobs, buttons and/or multi-touch screen for controlling power supply and/or power level from the power source to different parts of the system or the garment, for inputting personal data, and/or for a user to control the setting of said output device;
   wherein said built-in electronics comprises one or more built-in sensors sensing a change in position of said mechanical device in the garment within a time interval in order to trigger the generation of an instruction or signal for controlling the output while the behavior of the user at that particular instance is stored in the system; and
   wherein said mechanical device comprises one or more of a zipper, Velcro, buttons, button clips, clips, magnetic clips, and buckles, which activates said one or more built-in sensors when there is a change in position thereof.

3. The system of claim 1, wherein said change of the output setting initiated by the user is compared with the previous output setting by the user at the time of starting the system or during the operation of the system, whichever is the latest, such that the active learning process is triggered.

4. The system of claim 1, wherein said change in the sensor data is a difference between a sensor data received at a current time point and a sensor data received at a previous time point which is over the reference value such that the passive learning process is triggered.

5. The system of claim 1, wherein said computer processors and electronic circuities in the PCB are configured to take priority of the change in output setting initiated by the user over the change in sensor data for performing said learning actions when the change in output setting initiated by the user and the change in sensor data concurrently happen.

6. The system of claim 1,
wherein said first timer is reset when there is a subsequent output setting initiated by the user during the previous round of count-down; and
wherein said second timer is reset when there is a subsequent change in sensor data which is over the reference value during the previous round of count-down or when there is an output setting initiated by the user during the previous round of count-down.

7. The system as claimed in claim 1, further performing an inference action simultaneously when there is a subsequent change in sensor data, wherein the system searches through the learning database to determine the output settings.

8. The system as claimed in claim 7, wherein said computer processors and electronic circuities in the PCB retrieve the learning database of the user for output setting of said output device from the one or more third-party devices comprising a third-party sensor, and/or a data center, and/or a mobile device, and/or a server, which was previously recorded.

9. The system as claimed in claim 8, wherein said computer processors and electronic circuities in the PCB retrieve the learning database of a similar user for output setting of said output device from the one or more third-party devices comprising a third-party sensor, and/or a data center, and/or a mobile device, and/or a server.

10. The system as claimed in claim 1, wherein said computer processors and electronic circuities in the PCB are configured for performing a procedure of fetch similar users for the first time of using the garment.

* * * * *